United States Patent
Lin et al.

(10) Patent No.: US 7,257,312 B2
(45) Date of Patent: *Aug. 14, 2007

(54) FAST MOTION TRICK MODE USING DUMMY PREDICTIVE PICTURES

(75) Inventors: Shu Lin, Indianapolis, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1227 days.

This patent is subject to a terminal disclaimer.

(21) Appl. No.: 10/121,088

(22) Filed: Apr. 11, 2002

(65) Prior Publication Data

US 2003/0077070 A1    Apr. 24, 2003

Related U.S. Application Data

(60) Provisional application No. 60/334,914, filed on Oct. 23, 2001.

(51) Int. Cl.
*H04N 5/91* (2006.01)
*H04N 7/26* (2006.01)

(52) U.S. Cl. ......................... 386/68; 386/111
(58) Field of Classification Search .................. 386/68, 386/111; 725/88
See application file for complete search history.

(56) References Cited

U.S. PATENT DOCUMENTS 5,329,318 A    7/1994  Keith
5,838,678 A *  11/1998 Davis et al. ................ 370/389
5,946,446 A    8/1999  Yanagihara
6,031,960 A    2/2000  Lane
6,865,747 B1*  3/2005  Mercier ........................ 725/94
2002/0044761 A1*  4/2002  Takashima et al. ........... 386/68
2003/0159152 A1*  8/2003  Lin et al. ...................... 725/87

OTHER PUBLICATIONS

PCT Search Report.

* cited by examiner

*Primary Examiner*—Thai Q. Tran
*Assistant Examiner*—Girumsew Wendmagegn
(74) *Attorney, Agent, or Firm*—Joseph J. Laks; Robert B. Levy; Jorge Tony Villabon

(57) ABSTRACT

The invention concerns a method (200 or 300) and system (100) for performing a trick mode operation on a video signal containing a plurality of progressively scanned original pictures. The method (200) includes the step of selectively skipping (214) at least one of the original pictures to convert the video signal to a trick mode video signal in response to a trick mode command and the step of selectively inserting (216) at least one dummy predictive picture in the trick mode video signal. In addition, the method (300) can include the step of monitoring (316) the trick mode video signal so that the dummy predictive picture is selectively inserted when the bit rate exceeds a predetermined threshold. Display indicators of certain pictures in the trick mode video signal can also be modified (226) (328) to reflect an intended display order.

21 Claims, 4 Drawing Sheets

FAST MOTION TRICK MODE USING DUMMY PREDICTIVE PICTURES

CROSS REFERENCE TO RELATED APPLICATIONS

This is a non-provisional application of provisional application Ser. No. 60/334,914 filed Oct. 23, 2001.

STATEMENT REGARDING FEDERALLY SPONSORED RESEARCH OR DEVELOPMENT (Not Applicable)

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder or player's MPEG decoder before being displayed on the conventional television. Significantly, however, many DTVs contain their own MPEG decoders. As such, if a digital video recorder or player is connected to a DTV, the video signal read from the disc is remotely decoded by the DTVs decoder. This configuration can be referred to as a remote decoder arrangement.

There is, however, an important disadvantage in decoding digitally encoded signals with a remote DTV decoder. Namely, it is very difficult to perform trick modes in this type of arrangement. A trick mode can be any playback of video in which the playback is not done at normal speed or in a forward direction. Oftentimes, a trick mode involves skipping a number of pictures in a video signal such as during a fast motion trick mode. Skipping pictures in a video signal being transmitted to a remote decoder can actually increase the average bit rate of the signal. As the bandwidth between the digital video recorder or player and the DTV is limited, performing a fast motion trick mode may cause the signal to exceed the maximum bit rate limit of the transmission channel.

For instance, in an MPEG video signal, there are three separate types of digitally encoded pictures: intra (I) pictures, predictive (P) pictures and bidirectional predictive (B) pictures. As is known in the art, I and P pictures contain relatively large amounts of encoded data, at least with respect to B pictures. During a fast motion trick mode, the first pictures in a group of pictures (GOP) to be skipped are typically the B pictures. As the B pictures are skipped, however, the average amount of encoded data for the remaining pictures, or the average number of bits per picture, in the GOP increases. Such a drawback can lead to buffer overflow and the loss of pictures during the display of the trick mode video signal. Thus, a need exists for a method and system for performing a fast motion trick mode in a remote decoder arrangement without exceeding a maximum bit rate limit and without increasing system costs or complexity.

SUMMARY OF THE INVENTION

The present invention concerns a method of performing a trick mode on a video signal containing a plurality of progressively scanned original pictures. The method includes the steps of selectively skipping at least one of the original pictures to convert the video signal to a trick mode video signal in response to a trick mode command and selectively inserting at least one dummy predictive picture in the trick mode video signal. The method can also include the steps of monitoring the trick mode video signal and selectively inserting at least one dummy predictive picture in the trick mode video signal if the bit rate of the trick mode video signal exceeds a predetermined threshold.

In one arrangement, each of the plurality of original pictures can contain a display indicator, and the method can further include the step of selectively modifying the display indicator of at least a portion of the plurality of original pictures to reflect an intended display order when an original picture is skipped or when a dummy predictive picture is inserted in the trick mode video signal. The display indicator can be a temporal reference field.

In addition, each temporal reference field can have an integer value, and the step of selectively modifying the temporal reference field of at least a portion of the plurality of original pictures can include the step of incrementally decreasing by one the integer value of the temporal reference field of the subsequent original pictures each time an original picture is skipped. Alternatively, the selectively modifying step can include the step of incrementally increasing by one the integer value of the temporal reference field of the subsequent original pictures each time a dummy predictive picture is inserted in the trick mode video signal.

In one arrangement, the dummy predictive picture can be predicted from a reference picture. Further, the reference picture can be an intra picture or a predictive picture. In another arrangement, at least a portion of the trick mode video signal can be decoded by a remote decoder, and the trick mode can be a fast motion trick mode. In another aspect, the method can further include the step of, following the insertion of at least one dummy predictive picture, skipping at least one remaining original picture if the insertion of dummy predictive pictures in the trick mode video signal causes a playback speed of the trick mode video signal to decrease to an unacceptable level.

The present invention also concerns a system for performing a trick mode on a video signal containing a plurality of progressively scanned original pictures. The system includes a controller for reading data from a storage medium and outputting the video signal containing the plurality of original pictures and a video processor in which the processor is programmed to selectively skip at least one of the original pictures to convert the video signal to a trick mode video signal in response to a trick mode command and selectively insert at least one dummy predictive picture in the trick mode video signal. The system also includes suitable software and circuitry to implement the methods as described above.

DETAILED DESCRIPTION OF THE PREFERRED EMBODIMENTS

Figure 1:
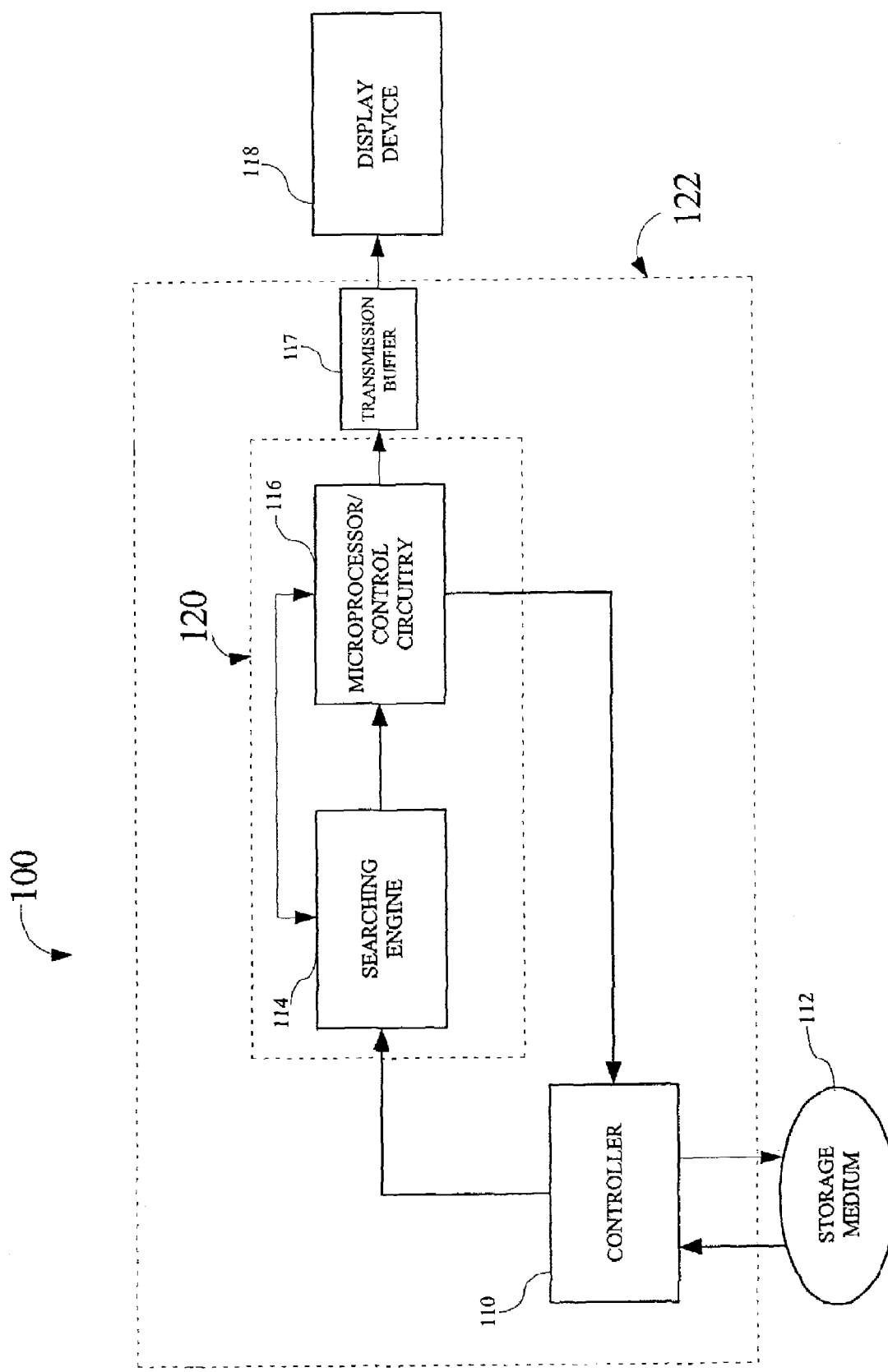
FIG. 1 is a block diagram of a system that can perform a fast motion trick mode using dummy predictive pictures in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a searching engine 114, a microprocessor 116, a transmission buffer 117 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive arrangements.

It should be understood that all or portions of the searching engine 114 and the microprocessor 116 can be a video processor 120 within contemplation of the present invention. Further, all or portions of the controller 110, the searching engine 114, the microprocessor 116 and the transmission buffer 117 can be a bitstream source 122 within contemplation of the present invention. In one arrangement, the display device 118 can contain its own decoder (not pictured) for decoding all or a portion of any video signal read from the storage medium 112 and processed by the bitstream source 122. In this particular arrangement, the decoder (not shown) in the bitstream source 122 typically does not decode the video signal read from the storage medium 112. This particular embodiment can be referred to as a remote decoder arrangement. It should be noted, however, that the invention is not limited to this arrangement, as the invention can be practiced in other suitable systems.

In operation, the controller 110 can read a video signal containing a plurality of progressively scanned original pictures from the storage medium 112. For convenience, the phrase "progressively scanned original pictures" will be shortened to "original pictures" throughout the application. In one arrangement, if the microprocessor 116 receives a trick mode command such as a fast motion command, then the microprocessor 116 can signal the searching engine 114 to locate one or more suitable original pictures in the trick mode video signal for purposes of skipping such a picture. Once located, the microprocessor can selectively skip at least one of the original pictures to convert the video signal to a trick mode video signal. The skipped pictures will not be decoded nor will they be displayed during the trick mode.

In addition, during the trick mode command, the microprocessor 116 can signal the searching engine to locate another set of one or more suitable original pictures for purposes of inserting dummy predictive (dummy P) pictures into the trick mode video signal. A dummy P picture is a picture that can be predicted from certain pictures and whose motion vectors and discrete cosine transform (DCT) coefficients are set to zero or not encoded. Once a suitable original picture is located, the searching engine 114 can signal the microprocessor 116, and the microprocessor 116 can generate a corresponding dummy P picture predicted from the located original picture. The microprocessor 116 can then selectively insert at least one of the corresponding dummy P pictures such that the dummy P picture is sent to the transmission buffer 117 and on to the display device 118. In this arrangement, the dummy P pictures can be used to repeat original pictures such that the dummy P picture is transmitted to the display device 118 and displayed.

In another aspect of the invention, the microprocessor 116 can monitor the bit rate of the trick mode video signal. If the bit rate of the trick mode video signal exceeds a predetermined threshold, then the microprocessor 116, in conjunction with the searching engine 114, can perform the selectively inserting step discussed above in which at least one dummy P picture can be inserted in the trick mode video signal.

In another arrangement, the microprocessor 116 can modify certain portions of information contained within one or more of the plurality of original pictures contained in the trick mode video signal to reflect an intended display order. This modification step can be performed whether original pictures are skipped or dummy P pictures are inserted in the video signal. The overall operation of the invention will be discussed in greater detail below.

Fast Motion Trick Mode Using Dummy Predictive Pictures

Figure 2:
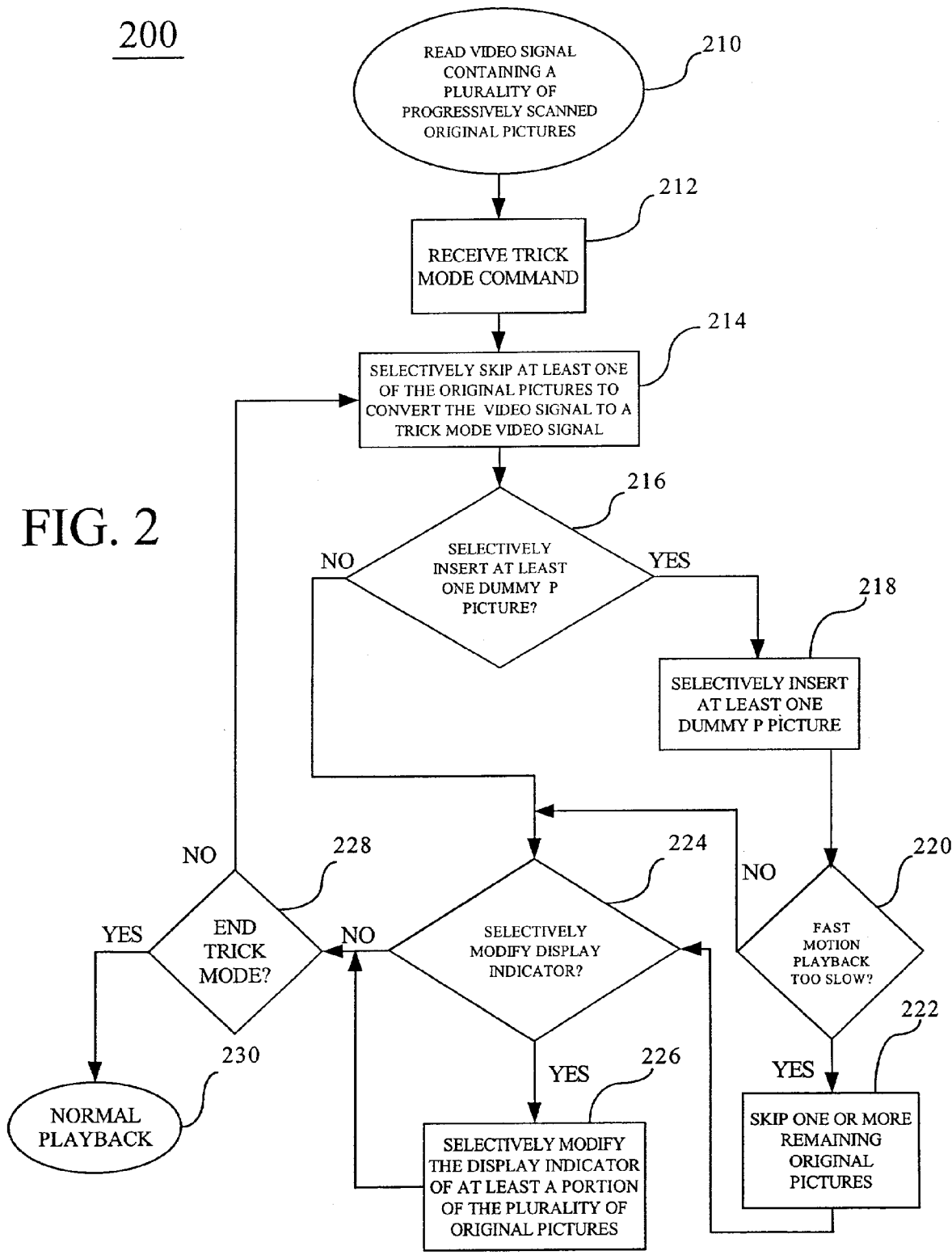
FIG. 2 is a flow chart that illustrates an operation of performing a fast motion trick mode using dummy predictive pictures in accordance with the inventive arrangements.

FIG. 2 is a flowchart illustrating a method 200 that demonstrates one way to operate in a trick mode such as a fast motion trick mode using dummy P pictures can be performed. In one arrangement, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder. As an example, the bitstream source can be an optical storage medium player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 210, a video signal containing a plurality of progressively scanned original pictures can be read. At step 212, a trick mode command can be received. For purposes of the invention, the trick mode command can be any command in which one or more of the original pictures are to be skipped, including a fast motion command such as fast forward or fast reverse. As shown at step 214, at least one of the original pictures can be selectively skipped. This selective skipping of pictures converts the video signal to a trick mode video signal.

Figure 4:
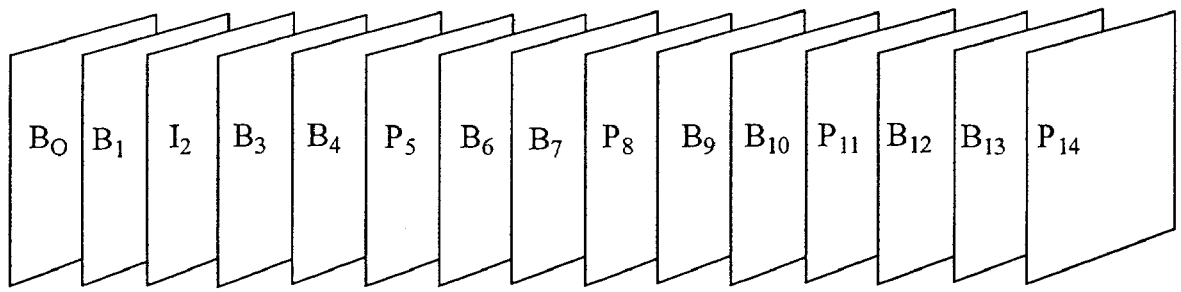
FIG. 4 illustrates a typical group of pictures structure in an MPEG video signal.

In one arrangement, the first original pictures to be skipped can be B pictures. Referring to FIG. 4, a typical group of pictures (GOP) 400 in display order is shown. The subscript numbers indicate when each picture will be displayed—relative to the other pictures in the GOP—at a normal playback speed. This GOP 400 can be one of many GOPs in a video signal. Although the invention is not limited to this particular GOP structure, the GOP 400 will serve to illustrate how a fast motion trick mode can be performed. For example, if a fast forward playback of 3× is desired (1× represents normal playback), then all the B pictures in the GOP 400 can be skipped. Thus, for this particular GOP, only the picture $I_2$ and the P pictures will be transmitted and/or decoded and displayed.

For a faster trick mode speed, some of the P pictures can be skipped and at certain speeds, the entire GOP 400 (including picture $I_2$) may be skipped. If P pictures are to be skipped, those of skill in the art will realize that it would be preferable to first skip the P pictures towards the end of a GOP. In this example, picture $P_{14}$ would be skipped first and then picture $P_{11}$ would be skipped and so on. Skipping pictures in this manner can preserve the proper decoding sequence necessary to decode those pictures that will be displayed during the trick mode.

As discussed earlier, however, skipping pictures in a GOP can cause the average bit rate of the trick mode video signal to increase. In fact, such an increase may exceed tolerable limits in the transmission channel carrying the trick mode video signal. Referring back to flowchart 200 in FIG. 2, it can be determined whether at least one dummy P picture is to be inserted in the trick mode video signal, as shown at decision block 216. If not, the flowchart 200 can continue at step 224, which will be explained below. If yes, then at step 218, at least one dummy P picture can be so inserted. Inserting dummy P pictures into the trick mode video signal can help lower the bit rate of such a signal.

As previously explained, a dummy P picture is a picture that can be predicted from certain pictures and whose motion vectors and discrete cosine transform (DCT) coefficients are set to zero or not encoded. As such, a dummy P picture contains very little information. A dummy P picture's primary purpose is to duplicate or repeat the picture from which it was predicted using very few bits. Thus, as dummy P pictures are placed into a fast motion trick mode video signal, the average number of bits per picture in the GOP decreases thereby lowering the average bit rate.

A picture from which a dummy P picture is predicted is commonly referred to as a reference picture, and any number of the original pictures can be reference pictures. In one arrangement, the reference picture can be either an I picture or a P picture. To illustrate an example of the insertion of dummy P pictures in a trick mode video signal, attention is once again directed to the GOP 400 in FIG. 4. If all the B pictures are skipped and pictures $P_{14}$ and $P_{11}$ are skipped (a playback speed of 5×), then any number of dummy P pictures can be inserted into the trick mode video signal to help lower the bit rate. These dummy P pictures can be predicted from either picture $I_2$, $P_5$ or $P_8$.

The addition of dummy P pictures into the trick mode video signal will decrease the playback speed of the trick mode. In one arrangement of the invention, at decision block 220, it can be determined whether the insertion of the dummy P pictures has slowed the fast motion playback to an unacceptable level. Referring to the above example of a playback speed of 5×, if two dummy P pictures are inserted into the trick mode video signal, then the playback speed will drop to 3×. If the decrease in playback speed is tolerable, then the process can continue to step 224. If this slowdown is unacceptable, then at step 222, one or more of the remaining original pictures can be skipped.

In one arrangement, an unacceptable slowdown can be a decrease in playback speed of roughly thirty percent from the intended trick mode playback speed. Of course, the invention is by no means limited to this particular factor, as other variations in the playback speed can be considered unacceptable. Following the insertion of the two dummy P pictures, pictures $P_5$ and $P_8$ can be skipped thereby increasing the playback speed back to 5×. In this embodiment, it is preferable to avoid skipping a reference picture from which the dummy P pictures are predicted.

The insertion of dummy P pictures can also reduce the choppiness of the display of the trick mode video signal, which can be particularly troublesome at a very fast motion trick mode. For example, referring back to GOP 400 in FIG. 4, if a 15× playback is to be performed (either in a forward or a reverse direction), then only picture $I_2$ will be decoded and displayed. This algorithm also applies to any other GOPs in the trick mode video signal. Thus, only the I pictures in subsequent GOPs for a fast forward trick mode and preceding GOPs for a fast reverse trick mode will be decoded and displayed. Such a display, however, can be very choppy and may cause an uncomfortable viewing experience, as jumping from I picture to I picture at a high rate may be difficult to follow because of scene changes or sudden appearances and disappearances of moving objects in the display.

Continuing with the example, inserting one or more dummy P pictures into the trick mode video signal after each I picture, however, can enhance the display of the trick mode. For example, a number of dummy P pictures predicted from $I_2$ can be inserted into the trick mode video signal. Because they are repeats of picture $I_2$, the dummy P pictures increase the amount of time the information in picture $I_2$ is displayed thereby reducing the choppiness of the display. This insertion step can also lower the average bit rate of the trick mode video signal, as, in this example, the signal will have a relatively high bit rate because only I pictures are being transmitted.

Because of their versatility, dummy P pictures can be inserted in almost any location in a trick mode video signal and at any suitable fast motion trick mode speed. Accordingly, the invention is in no way limited to the foregoing examples, as those skilled in the art will appreciate that there are numerous insertion sequences that can be used to lower the bit rate of a trick mode video signal or to reduce the choppiness of such a signal.

In another embodiment, each of the plurality of original pictures can contain a display indicator. Referring back to flowchart 200 in FIG. 2, as determined at decision block 224, if the display indicators of these pictures are to be selectively modified, then the display indicator of at least a portion of the plurality of original pictures can be selectively modified, as shown at step 226.

Notably, modifying these display indicators can reflect an intended display order of the plurality of original pictures when an original picture is skipped or when a dummy P picture is inserted in the trick mode video signal. It is understood, however, that this process can be performed irrespective of whether dummy P pictures are being inserted into the trick mode video signal. Thus, the step of modifying a display indicator can be performed during a conventional fast motion trick mode in which pictures are merely skipped and no dummy P pictures are inserted into the trick mode video signal. If the display indicators are not to be modified, then the flowchart 200 can continue at step 228.

In one arrangement, the display indicator can be a temporal reference field. A temporal reference field is typically a ten bit field located in the picture header of digitally encoded pictures. Some decoders rely on the temporal reference field to determine when a particular picture in a video signal will be displayed relative to other pictures in the video signal. This field normally has an integer value.

As an example, referring once again to FIG. 4, GOP 400 contains fifteen pictures. The subscript numbers for the pictures in the GOP 400 can correspond to the integer values for each respective picture's temporal reference field. For instance, the temporal reference field of picture $B_0$, the first picture in the GOP, can have an integer value of zero. The temporal reference field of picture B1, the next picture to be displayed, can have an integer value of one. Thus, the integer value of the temporal reference field for each subsequent picture to be displayed can be increased by one, all the way to picture $P_{14}$, whose temporal reference field can have an integer value of 14. For convenience, the phrase "integer value of the temporal reference field" can also be referred to as "integer value."

When an original picture is skipped or if a dummy P picture is inserted in the trick mode video signal, however, the display order according to the temporal reference fields of the original pictures is no longer valid. Accordingly, the integer value of the temporal reference fields of the original pictures that follow the inserted dummy P pictures or skipped original pictures can be modified to indicate a proper display order. For example, if pictures $B_9$ and $B_{10}$ are skipped, then the integer values of those original pictures that follow can be decreased by a value of two. So, the integer value of the temporal reference field of picture $P_{11}$ can be modified from eleven to nine, the integer value of the temporal reference field of picture $B_{12}$ can be modified from twelve to ten and so on. This modification process can continue until the end of the GOP 400 is reached and can ensure that the remaining pictures in the GOP 400 will be displayed in a proper order. Thus, each time an original picture in a GOP is skipped, the integer values of the temporal reference fields of the remaining pictures in that GOP can be decreased by a value of one.

In addition, if dummy P pictures are inserted into the trick mode video signal, then the integer value of the temporal reference fields of the original pictures that follow can be increased by an appropriate value to reflect an intended display order. As an example, if all the B pictures and the last two P pictures in the GOP 400 are skipped, then only picture $I_2$, $P_5$ and $P_8$ would remain. To reflect an intended display order, the integer value of the temporal reference field for picture $I_2$ can be modified from two to zero, the integer value for $P_5$ can be modified from five to one and the integer value for $P_8$ can be modified from eight to three.

If, for example, four dummy P pictures are inserted into the trick mode video signal following picture $I_2$, the integer values for the remaining P pictures would be as follows: the integer value for $P_5$ can be modified from one back to five (the integer value prior to the initiation of the trick mode) and the integer value for $P_8$ can be modified from two to seven. As a result, each time a dummy P picture is inserted in the trick mode video signal, the integer value of the temporal reference fields of the following remaining original pictures can be increased by an integer value of one.

The step of modifying the integer values of the temporal reference fields of the non-skipped pictures in other GOPs in the trick mode video signal can be carried out in accordance with these examples. It must be noted, however, that the invention is not limited to these particular examples, as other ways to modify the integer values of the relevant temporal reference fields to reflect an intended display order can be performed in any other suitable fashion. Moreover, it should be noted that the invention is not limited to the use of a temporal reference field, as any other suitable display indicator can be modified to reflect an intended display order in either of the embodiments discussed above. Referring back to the method 200 in FIG. 2, once the display indicator has been selectively modified, the process can continue at decision block 228. If the trick mode is to continue, then the trick mode can continue at step 214. If not, normal playback can resume at step 230.

Figure 3:
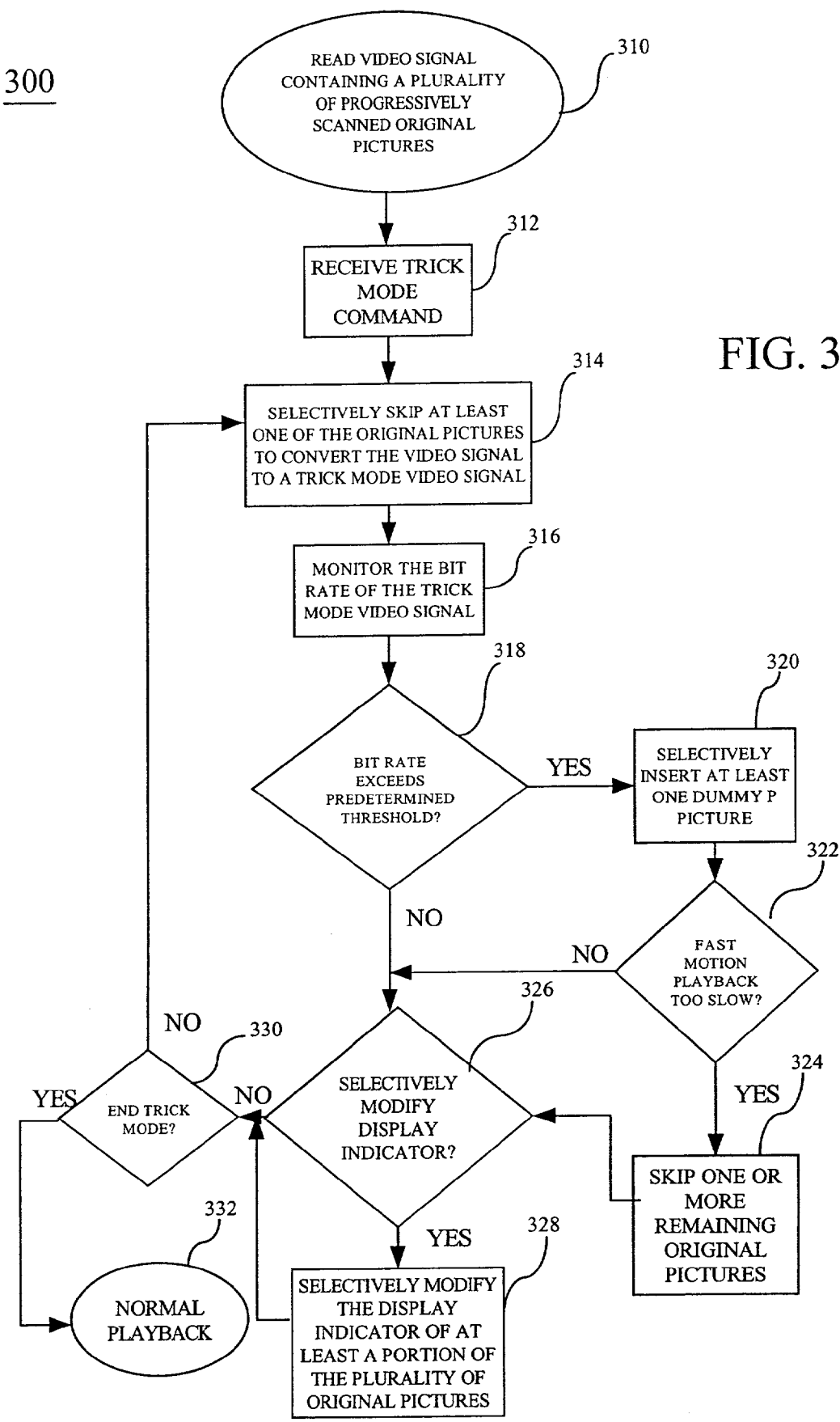
FIG. 3 is a flow chart that illustrates an alternative operation of performing a fast motion trick mode using dummy predictive pictures in accordance with the inventive arrangements.

Referring to FIG. 3, a flowchart represents an alternative method 300 to the trick mode discussed with respect to the method 200. As shown in method 300, steps 310-314 are identical to steps 210-214 in the method 200 and, accordingly, warrant no discussion here. At step 316, during the trick mode command, the bit rate of the trick mode video signal can be monitored. Monitoring the bit rate of the trick mode video signal may be necessary during a fast motion trick mode because, as mentioned earlier, skipping pictures may result in an increased average bit rate. In certain cases, this increased bit rate may exceed the maximum allowable bit rate for the transmission channel that is carrying the video signal. For purposes of the invention, this maximum allowable bit rate for the transmission channel can be referred to as a predetermined threshold.

At decision block 318, it can be determined whether the bit rate of the trick mode video signal has exceeded this predetermined threshold. If the bit rate has not reached the predetermined threshold, then the flowchart 300 can continue at decision block 326. Referring back to step 318, if the bit rate has exceeded the predetermined threshold, then dummy P pictures can be inserted in the trick mode video signal, as shown at step 320. Also, if desired, following the insertion of the dummy P pictures, one or more of the remaining original pictures can be skipped to increase the playback speed, as shown at steps 322 and 324. In addition, the display indicators of at least a portion of the original pictures can be modified, as shown at steps 326 and 328.

The procedures shown in steps 320, 322, 324, 326 and 328 are similar to the corresponding procedures illustrated in the method 200 of FIG. 2. Thus, the insertion of dummy P pictures can occur based on the monitoring of the bit rate of the trick mode video signal and can be performed if this bit rate exceeds a predetermined threshold. At decision block 330, it can be determined whether the trick mode is to continue. If yes, then the method 300 can resume at step 314. If not, normal playback can resume at step 322.

Although the present invention has been described in conjunction with the embodiments disclosed herein, it should be understood that the foregoing description is intended to illustrate and not limit the scope of the invention as defined by the claims.

What is claimed is:

1. A method of performing a trick mode on a video signal containing a plurality of progressively scanned original pictures, comprising the steps of:

in response to a trick mode command, selectively skipping at least one of the original pictures to convert the video signal to a trick mode video signal;

monitoring the trick mode video signal; and selectively inserting at least one dummy predictive picture in the trick mode video signal if the bit rate of the trick mode video signal exceeds a predetermined threshold.

2. The method according to claim 1, further comprising the step of selectively modifying a display indicator of at least a portion of the plurality of original pictures to reflect an intended display order when an original picture is skipped or when a dummy predictive picture is inserted in the trick mode video signal.

3. The method according to claim 2, wherein the display indicator is a temporal reference field.

4. The method according to claim 3, comprising the step of incrementally decreasing by one each integer value of the temporal reference field each time an original picture is skipped.

5. The method according to claim 3, comprising the step of incrementally increasing by one each integer value of the temporal reference field each time a dummy predictive picture is inserted in the trick mode video signal.

6. The method according to claim 1, comprising the step of predicting each dummy predictive picture from a reference picture.

7. The method according to claim 6, wherein the reference picture is an intra picture.

8. The method according to claim 6, wherein the reference picture is a predictive picture.

9. The method according to claim 1, comprising the step of decoding at least a portion of the trick mode video signal by a remote decoder.

10. The method according to claim 1, wherein the trick mode is a fast motion trick mode.

11. The method according to claim 1, wherein the method further comprises the step of, following the insertion of at least one dummy predictive picture, skipping at least one remaining original picture if the insertion of dummy predictive pictures in the trick mode video signal causes a playback speed of the trick mode video signal to decrease to an unacceptable level.

12. In a remote decoder arrangement, a method of performing a trick mode on a video signal containing a plurality of progressively scanned original pictures, wherein each of the plurality of progressively scanned original pictures contains a display indicator, comprising the steps of:

in response to a trick mode command, selectively skipping at least one of the original pictures to convert the video signal to a trick mode video signal;

monitoring a bit rate of the trick mode video signal;

selectively inserting at least one dummy predictive picture in the trick mode video signal if the bit rate exceeds a predetermined threshold; and selectively modifying the display indicator of at least a portion of the plurality of original pictures to reflect an intended display order when an original picture is repeated or when a dummy predictive picture is inserted in the trick mode video signal.

13. A system for performing a trick mode on a video signal containing a plurality of progressively scanned original pictures, comprising a controller for reading data from a storage medium and outputting the video signal containing the plurality of original pictures; and a video processor, wherein the processor is programmed to:

in response to a trick mode command, selectively skip at least one of the original pictures to convert the video signal to a trick mode video signal;

monitor the trick mode video signal; and selectively insert at least one dummy predictive picture in the trick mode video signal if the bit rate of the trick mode video signal exceeds a predetermined threshold.

14. The system according to claim 13, wherein each of the plurality of original pictures contains a display indicator and the video processor is further programmed to modify selectively the display indicator of at least a portion of the plurality of original pictures to reflect an intended display order when an original picture is skipped or when a dummy predictive picture is inserted in the trick mode video signal.

15. The system according to claim 14, wherein the display indicator is a temporal reference field.

16. The system according to claim 15, wherein each temporal reference field has an integer value and the video processor is further programmed to modify selectively the temporal reference field of at least a portion of the plurality of original pictures by incrementally decreasing by one the integer value of the temporal reference field each time an original picture is skipped.

17. The system according to claim 16, wherein the video processor is further programmed to modify selectively the temporal reference field of at least a portion of the plurality of original pictures by incrementally increasing by one the integer value of the temporal reference field each time a dummy predictive picture is inserted in the trick mode video signal.

18. The system according to claim 13, further comprising a remote decoder for remotely decoding at least a portion of the trick mode video signal.

19. The system according to claim 13, wherein the trick mode is a fast motion trick mode.

20. The system according to claim 13, wherein the video processor is further programmed to, following the insertion of at least one dummy predictive picture, skip at least one remaining original picture if the insertion of dummy predictive pictures in the trick mode video signal causes a playback speed of the trick mode video signal to decrease to an unacceptable level.

21. A remote decoder system for performing a trick mode on a video signal containing a plurality of progressively scanned original pictures, wherein each of the plurality of progressively scanned original pictures contains a display indicator, comprising:

a controller for reading data from a storage medium and outputting the video signal containing the plurality of original pictures; and a video processor, wherein the processor is programmed to:

in response to a trick mode command, selectively skip at least one of the original pictures to convert the video signal to a trick mode video signal;

monitor a bit rate of the trick mode video signal;

selectively insert at least one dummy predictive picture in the trick mode video signal if the bit rate exceeds a predetermined threshold; and selectively modify the display indicator of at least a portion of the plurality of original pictures to reflect an intended display order when an original picture is skipped or when a dummy predictive picture is inserted in the trick mode video signal.

* * * * *